United States Patent
Cardona et al.

(10) Patent No.: US 8,139,595 B2
(45) Date of Patent: Mar. 20, 2012

(54) PACKET TRANSFER IN A VIRTUAL PARTITIONED ENVIRONMENT

(75) Inventors: Omar Cardona, Austin, TX (US);
James Brian Cunningham, Austin, TX (US); Baltazar De Leon, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/972,719

(22) Filed: Jan. 11, 2008

(65) Prior Publication Data

US 2009/0182967 A1    Jul. 16, 2009

(51) Int. Cl.
*H04L 12/28* (2006.01)
(52) U.S. Cl. ........................... 370/412; 370/413
(58) Field of Classification Search ............ None
See application file for complete search history.

(56) References Cited

U.S. PATENT DOCUMENTS

| | | | |
|---|---|---|---|
| 6,229,789 B1 * | 5/2001 | Simpson et al. | 370/235 |
| 6,650,640 B1 * | 11/2003 | Muller et al. | 370/392 |
| 6,681,303 B1 * | 1/2004 | Watanabe et al. | 711/162 |
| 6,940,814 B1 * | 9/2005 | Hoffman | 370/235 |
| 2002/0176430 A1 * | 11/2002 | Sangha et al. | 370/412 |
| 2005/0078708 A1 * | 4/2005 | Bender et al. | 370/475 |
| 2005/0232279 A1 * | 10/2005 | Brown et al. | 370/400 |
| 2006/0080514 A1 * | 4/2006 | Newport | 711/153 |

OTHER PUBLICATIONS

RATCLIFF, "software Interface for Asynchronous Data Transfers", IBM Technical Disclosure Bulletin, vol. 38, PubNo. 4, Apr. 1995, pp. 423-426.

* cited by examiner

*Primary Examiner* — Phirin Sam
(74) *Attorney, Agent, or Firm* — Yee & Associates, P.C.; David A. Mims, Jr.

(57) ABSTRACT

A computer implemented method, computer product code, and data processing system are provided for transferring data between virtual partitions. A request is received to transfer a packet from a first partition to a second partition. A free buffer is identified from a buffer pool of the second partition, and a receive descriptor is written. A bit within the receive descriptor is set to identify a receive descriptor ring of second partition. A first interrupt is generated to the second partition. The packet is then copied to the free buffer, and the receive descriptor is updated.

20 Claims, 5 Drawing Sheets

PACKET TRANSFER IN A VIRTUAL PARTITIONED ENVIRONMENT

BACKGROUND OF THE INVENTION

1. Field of the Invention

The present invention relates generally methods, computer program product code, and systems for data processing systems. More specifically, the present invention relates to methods, computer program product code, and systems for transferring data between virtual partitions of a logical partitioned data processing system.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory dual in-line memory modules (DIMMs), non-volatile random access memory (NVRAM), and hard disk drives. Each partition within a logical partitioned data processing system may be booted and shut down over and over without having to power-cycle the entire data processing system.

SUMMARY OF THE INVENTION

A computer implemented method, computer product code, and data processing system are provided for transferring data between virtual partitions. A request is received to transfer a packet from a first partition to a second partition. A free buffer is identified from a buffer pool of the second partition, and a receive descriptor is written. A bit within the receive descriptor is set to identify a receive descriptor ring of second partition. A first interrupt is generated to the second partition. The packet is then copied to the free buffer, and the receive descriptor is updated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
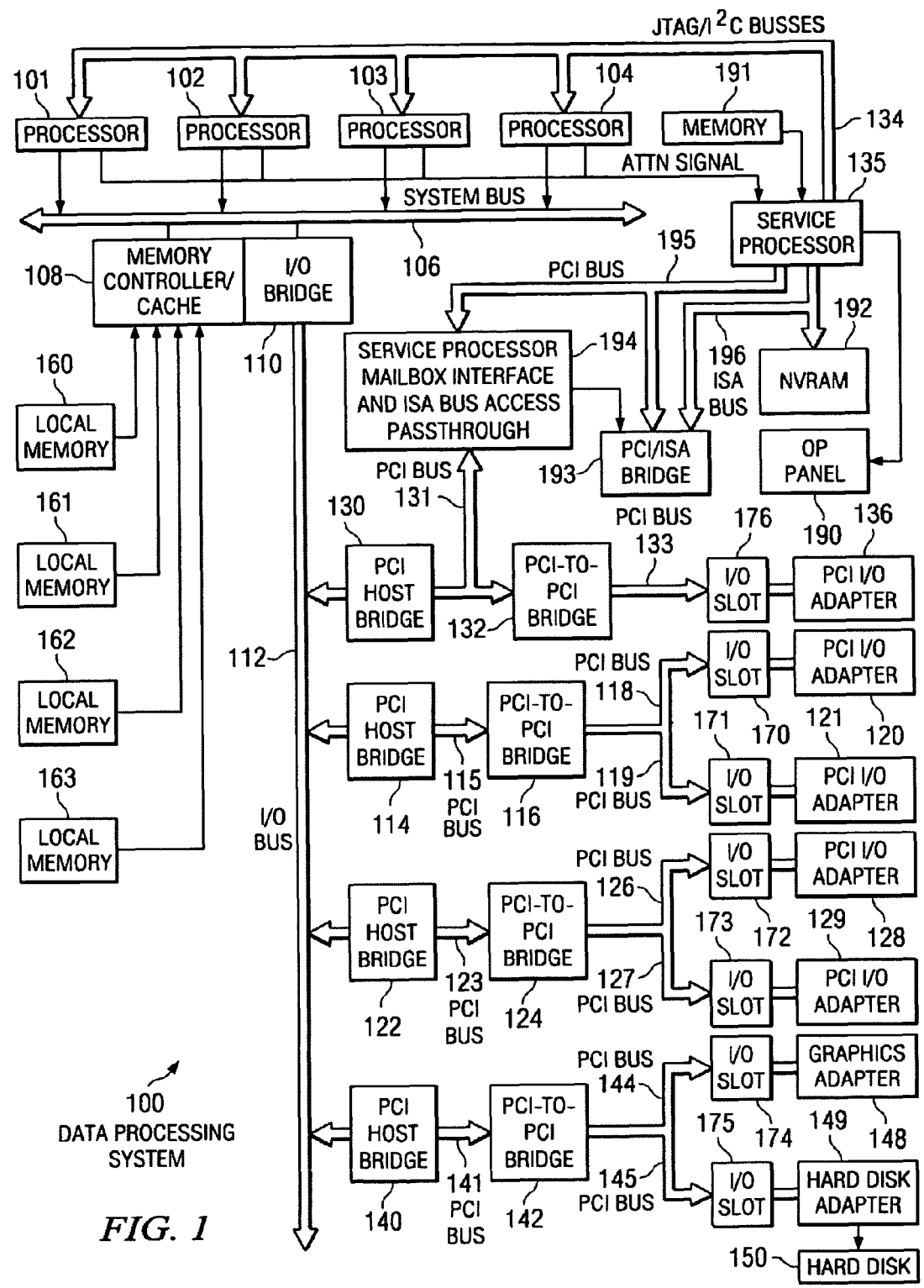
FIG. 1 is a block diagram of a data processing system in which illustrative embodiments may be implemented.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATS, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
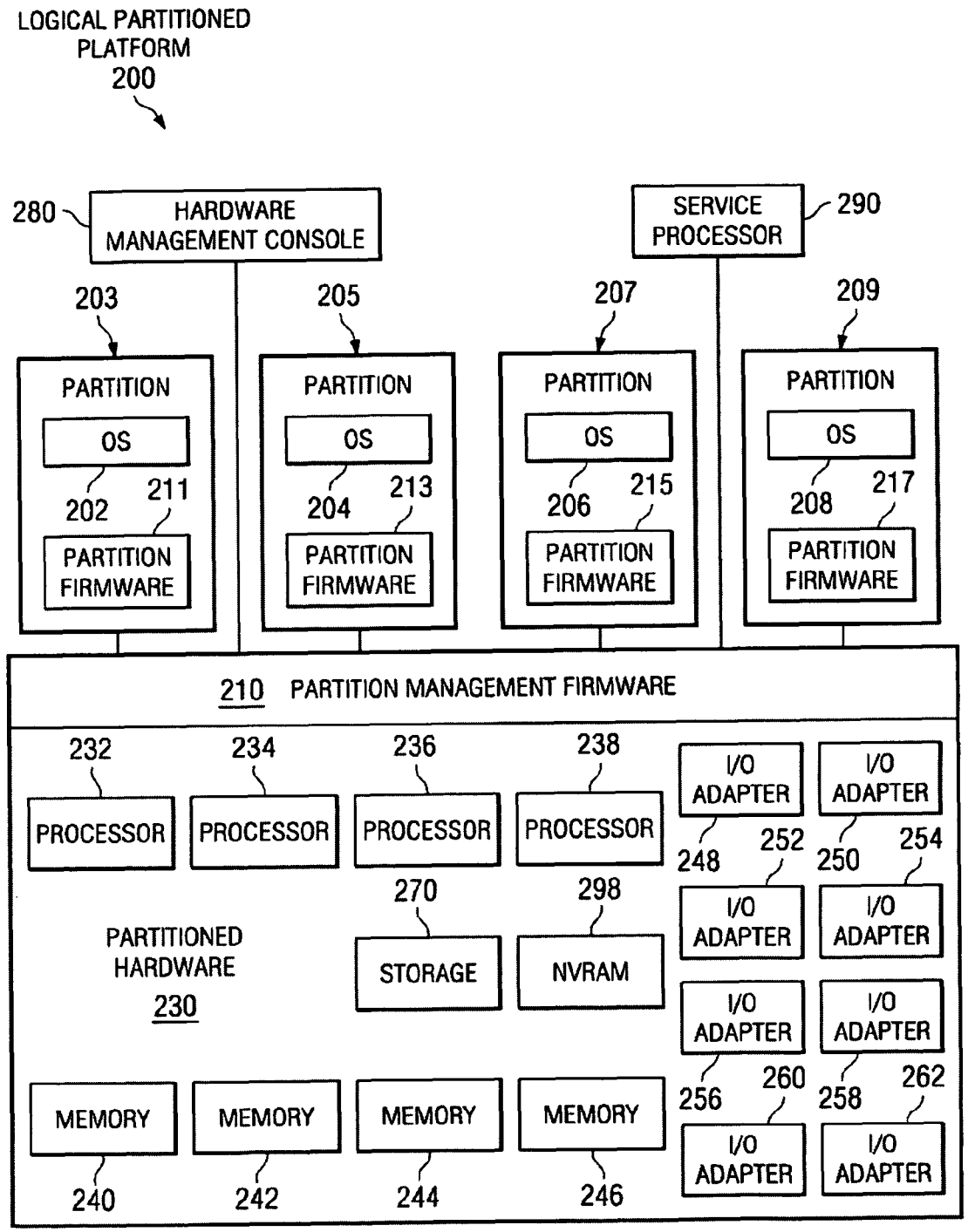
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The present embodiments provide a computer implemented method, computer product code, and data processing system for transferring data between virtual partitions. A request is received to transfer a packet from a first partition to a second partition. A free buffer is identified from a buffer pool of the second partition, and a receive descriptor is written. A bit is set to identify a receive descriptor within the receive descriptor ring of second partition. A first interrupt is generated to the second partition. The packet is then copied to the free buffer, and the receive descriptor is updated.

When transferring data between virtual partitions according to the described embodiments, the changing and setting of the bits is all performed in a single call to the partition management firmware. The first partition makes the send call to the partition management firmware. The partition management firmware then writes the receive descriptor and sets a bit to identify a receive descriptor within the receive descriptor ring of second partition. The partition management firmware then notifies the second partition, and performs the copy. The partition management firmware then updates the receive descriptor within the receive descriptor ring of second partition.

Figure 3:
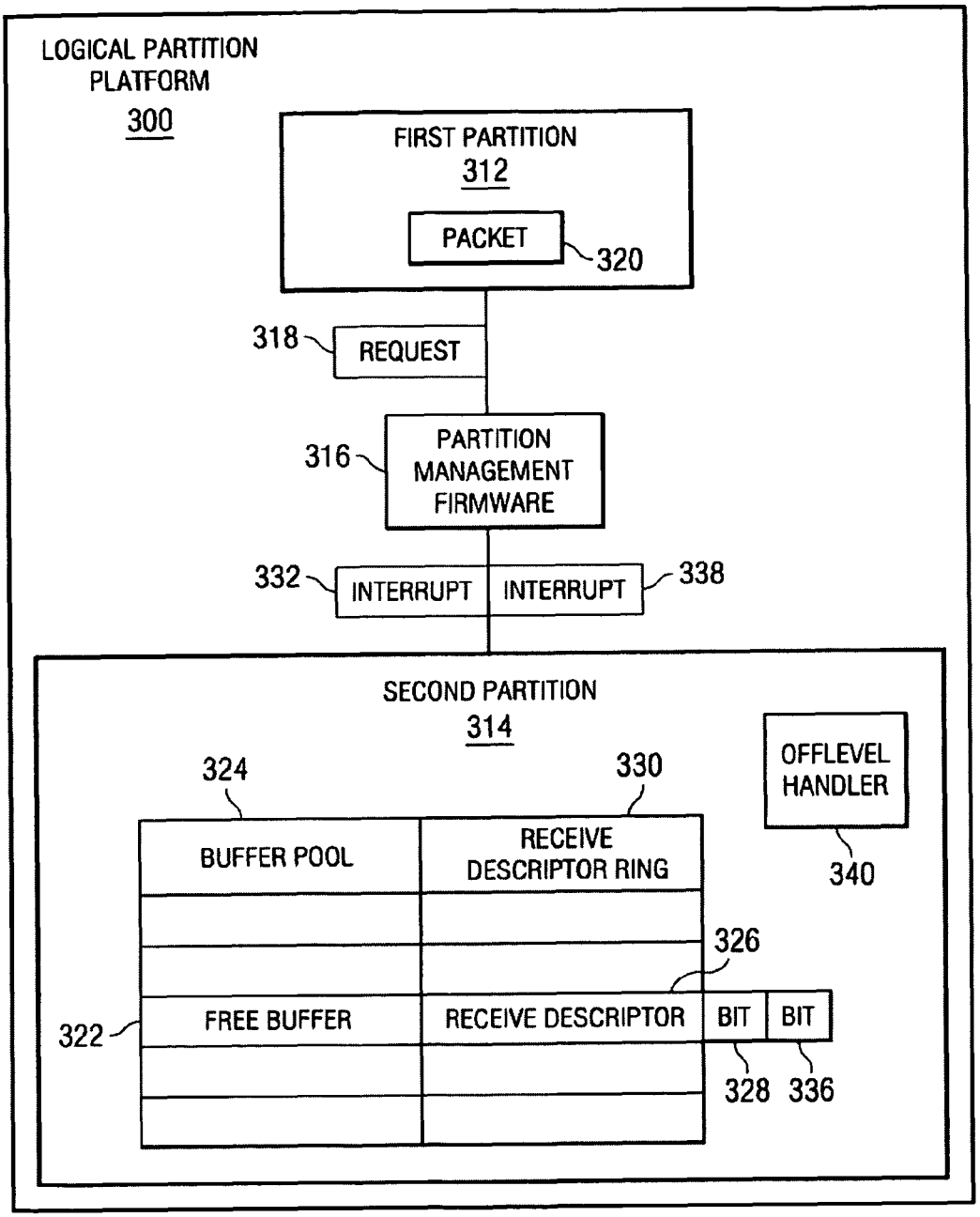
FIG. 3 is a block diagram of data flow for parallel sending and receiving of a packet through an exemplary logical partitioned platform in which illustrative embodiments may be implemented.

Referring now to FIG. 3, a block diagram of data flow for parallel sending and receiving of a packet through an exemplary logical partitioned platform is depicted in which illustrative embodiments may be implemented. The hardware in logical partitioned platform 300 may be implemented as, for example, data processing system 100 in FIG. 1. Logical partitioned platform 300 can be logical partition platform 200 of FIG. 2. Logical partitioned platform 300 includes first partition 312 and second partition 314, which can be partitions 203, 205, 207, and 209 of FIG. 2. Logical partitioned platform 300 includes partition management firmware 316, which can be partition management firmware 210 of FIG. 2.

First partition 312 issues a send request 318 to partition management firmware 316 to send packet 320 to second partition 314. Request 318 can be any request from one partition to another. Packet 320 can be any a formatted block of data carried that is to be transferred between partitions.

Responsive to receiving request 318, partition management firmware 316 identifies free buffer 322 from buffer pool 324 of second partition 314. Buffer pool 324 is memory partitioned to second partition 314 and associated with receive descriptor ring 330, that is used to cache table and index data pages as they are being read from disk, or being modified. Free buffer 322 is a block or blocks of memory within buffer pool 324 that is not currently occupied.

Partition management firmware 316 then writes receive descriptor 326 and sets bit 328 to identify free buffer 322 within receive descriptor ring 330 of second partition 314. Receive descriptor ring 330 is a list of storage buffer addresses that are in communication with second partition 314. Receive descriptor 326 is one buffer address within receive descriptor ring 330. Bit 328 is associated with receive descriptor 326. When bit 328 is set, bit 328 indicates that the buffer associated with receive descriptor 326 is being held by receive descriptor ring 330, so that the buffer is unavailable for other uses. When cleared, bit 328 indicates that the buffer associated with receive descriptor 326 is available for use by second partition 314.

Partition management firmware 316 then generates interrupt 332 to second partition 314. Interrupt 332 is a synchronous event indicating the need for a change in execution of second partition 314. Interrupt 332 is a software interrupt that can be implemented as instructions in the instruction set, which cause a context switch to second partition 314. Interrupt 332 instructs second partition 314 to process receive descriptor 326. Responsive to receiving interrupt 332, second partition 314 reads receive descriptor 326 from receive descriptor ring 330. Second partition 314 then begins to process receive descriptor 326.

Partition management firmware 316 copies packet 320 to free buffer 322 of receive descriptor ring 330 of second partition 314. Free buffer 322 is the buffer to which receive descriptor 326 is pointing.

Partition management firmware 316 updates receive descriptor 326 by setting copy-complete bit 336. Copy-complete bit 336 is set within receive descriptor ring 330 of second partition 314, indicating that packet 320 has been copied into free buffer 322. When copy-complete bit 336 is set, copy-complete bit 336 indicates that that packet 320 has been copied into free buffer 322, and that second partition 314 can further process packet 320. When cleared, copy-complete bit 336 indicates that free buffer 322 does not contain a packet that requires further processing.

Responsive to the setting of copy-complete bit 336, second partition 314 may carry out the remaining processing of packet 320 in a variety of manners. In one illustrative embodiment, responsive to setting copy-complete bit 336, partition management firmware 316 generates interrupt 338 to second partition 314. Interrupt 338 is a synchronous event indicating the need for a change in execution of second partition 314. Interrupt 338 is a software interrupt that can be implemented as instructions in the instruction set, which cause a context switch to second partition 314. Interrupt 338 instructs second partition 314 to send packet 320 up the stack for further processing.

As an alternative to generating interrupt 338, second partition 314 may poll receive descriptor ring 330 for the setting of copy-complete bit 336 by partition management firmware 316. Responsive to detecting the setting of copy-complete bit 336 by partition management firmware 316, second partition 314 sends packet 320 up the stack for further processing.

As a further alternative to generating interrupt 338, second partition 314 or partition management firmware 316 may schedule offlevel handler 340 to recheck for the setting of copy-complete bit 336. The offlevel handler 340 is run on second partition 314. Offlevel handler 340 interprets and executes commands to transmit and receive data. Responsive to offlevel handler 340 detecting the setting of copy-complete bit 336 by partition management firmware 316, second partition 314 sends packet 320 up the stack for further processing.

Figure 4:
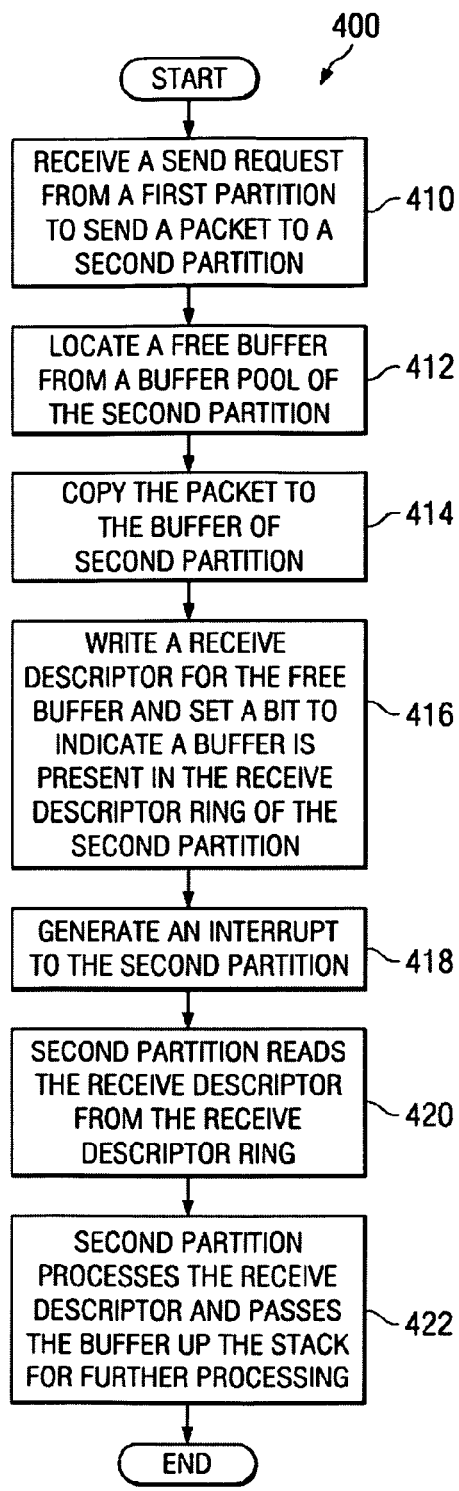
FIG. 4 is a block diagram of serial data transfer through logical partitioned platform according to prior art.

Referring now to FIG. 4, a block diagram of serial data transfer through logical partitioned platform is depicted according to prior art. Process 400 is a software process executing within a logical partitioned platform, such as logical partitioned platform 200 of FIG. 2.

Process 400 begins by receiving a send request from a first partition to send a packet to second partition (step 410). The packet to be sent can be any a formatted block of data carried that is to be transferred between partitions.

Responsive to receiving the request, process 400 identifies a free buffer from a buffer pool of the second partition (step 412). The buffer pool is a memory partitioned to the second partition and associated with the receive descriptor ring that is used to cache table and index data pages as they are being read from disk, or being modified. The free buffer is a block or blocks of memory within the buffer pool that is not currently occupied. Process 400 then copies the packet to the buffer of the second partition (step 414).

Process 400 then writes a receive descriptor for the free buffer and sets a bit to indicate a buffer is present in the receive descriptor ring of the second partition (step 416). The receive descriptor ring is a list of storage buffer addresses that are in communication with the second partition. The receive descriptor is written into the next free slot within the receive descriptor ring. The bit is associated with the receive descriptor. When the bit is set, the bit indicates that a buffer is present in the receive descriptor that requires processing. When cleared, the bit indicates that there is no buffer present requiring processing.

Process 400 then generates an interrupt to the second partition (step 418). The interrupt is a synchronous event indicating the need for a change in execution of the second partition. The interrupt is a software interrupt that can be implemented as instructions in the instruction set, which cause a context switch to the second partition. The interrupt instructs the second partition to process the receive descriptor.

Responsive to receiving the interrupt, the second partition reads the receive descriptor from receive descriptor ring (step 420). The second partition then processes the receive descriptor, and passes the buffer up the stack for further processing (step 422), with the process terminating thereafter.

Each step of the prior art implemented packet transfer are serially performed by the various partitions. Each partition will sequentially finish its own processing of the packet prior to processing beginning within another partition.

Figure 5:
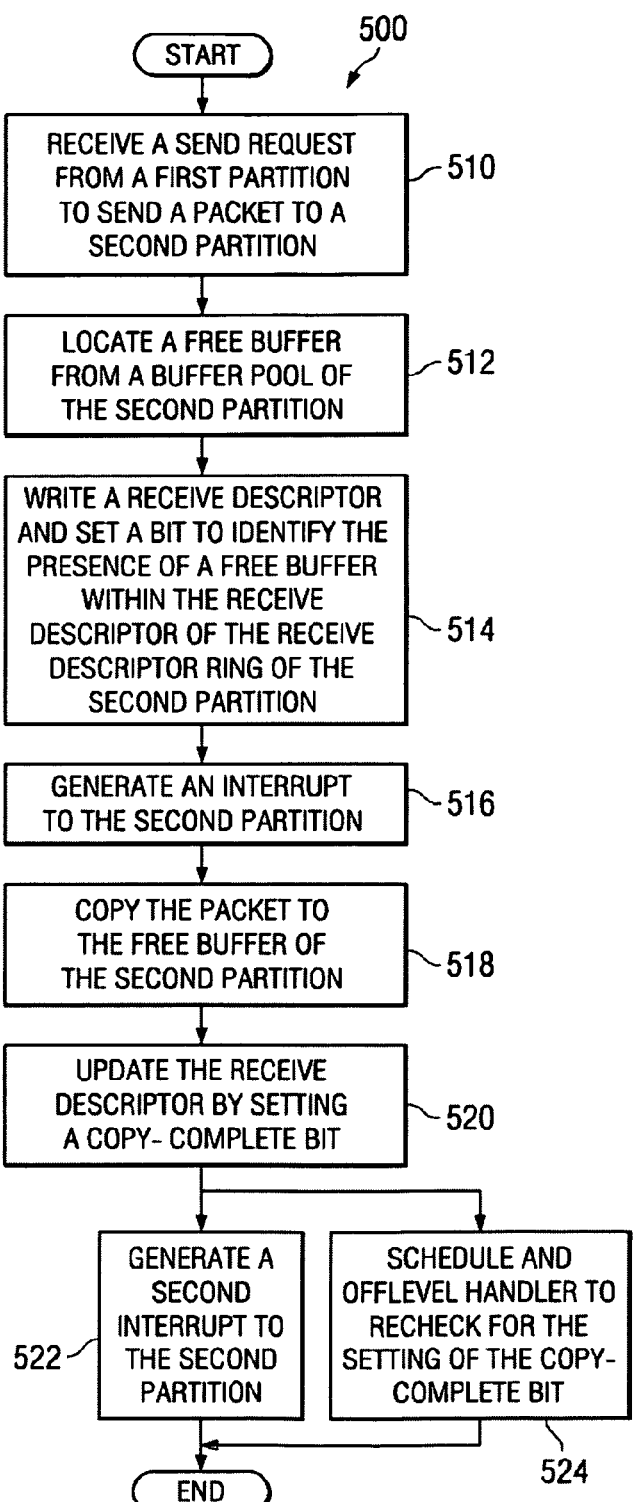
FIG. 5 is a block diagram of parallel data transfer through a partition management firmware of a logical partitioned platform in which illustrative embodiments may be implemented.

Referring now to FIG. 5, a block diagram of parallel data transfer through a partition management firmware of a logical partitioned platform is depicted in which illustrative embodiments may be implemented. Process 500 is executed within a logical partitioned platform, such as logical partitioned platform 200 of FIG. 2. Process 500 is a software process executing on a software component, such as partition management firmware 210 of FIG. 2.

Process 500 begins by receiving a send request from a first partition to send a packet to second partition (step 510). The packet to be sent can be any a formatted block of data carried that is to be transferred between partitions.

Responsive to receiving the request, process 500 identifies a free buffer from a buffer pool of the second partition (step 512). The buffer pool is a memory partitioned to the second partition and associated with the receive descriptor ring that is used to cache table and index data pages as they are being read from disk, or being modified. The free buffer is a block or blocks of memory within the buffer pool that is not currently occupied.

Process 500 then writes a receive descriptor and sets a bit to identify the presence of a free buffer within the receive descriptor of the receive descriptor ring of the second partition (step 514). The receive descriptor ring is a list of storage buffer addresses that are in communication with the second partition. The receive descriptor is written into the next free entry within the receive descriptor ring. The bit is associated with the buffer indicated in the receive descriptor. When the bit is set, the bit indicates the descriptor contains a buffer that requires processing. When cleared, the bit indicates that no buffer is present that requires processing.

Process 500 then generates an interrupt to the second partition (step 516). The interrupt is a synchronous event indicating the need for a change in execution of the second partition. The interrupt is a software interrupt that can be implemented as instructions in the instruction set, which cause a context switch to the second partition. The interrupt instructs the second partition to process the receive descriptor. Responsive to generating the interrupt, process 500 then copies the packet to the buffer of the second partition (step 518).

Process 500 then updates the receive descriptor by setting a copy-complete bit (step 520). The copy-complete bit is set within the receive descriptor of the second partition, indicating that the packet has been copied into the buffer. When the copy-complete bit is set, the copy-complete bit indicates that that the packet has been copied into the buffer, and that the second partition can further process the packet. When cleared, the copy-complete bit indicates that the packet has not yet been copied to the buffer.

Depending on the implementation for notification of the setting of copy-complete bit, process 500 can then optionally generate a second interrupt to the second partition (step 522), with the process terminating thereafter. The second interrupt is a synchronous event indicating the need for a change in execution of the second partition. The interrupt is a software interrupt that can be implemented as instructions in the instruction set, which cause a context switch to the second partition. Interrupt instructs second partition to send the packet up the stack for further processing.

Depending on the implementation for notification of the setting of copy-complete bit, process 500 can then optionally schedule offlevel handler to recheck for the setting of copy-complete bit (step 524). The offlevel handler interprets and executes commands to transmit and receive data. Responsive to the offlevel handler detecting the setting of the copy-complete bit by the partition management firmware, the second partition sends the packet up the stack for further processing.

Figure 6:
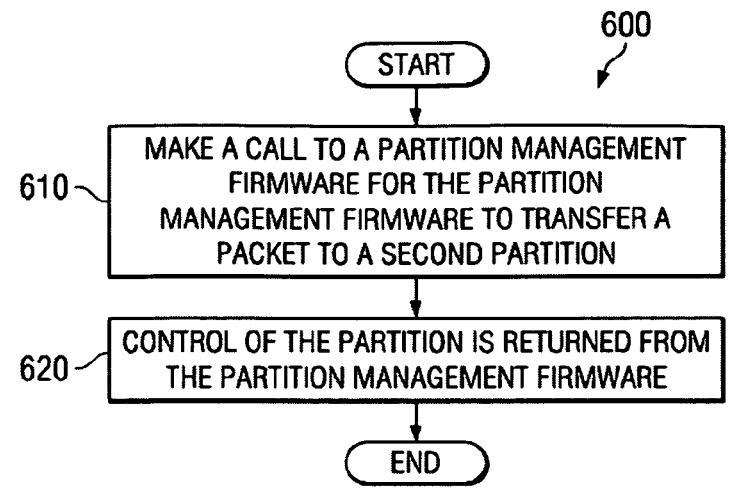
FIG. 6 is a block diagram of parallel data transfer from a first partition of a logical partitioned platform in which illustrative embodiments may be implemented.

Referring now to FIG. 6, a block diagram of parallel data transfer from a first partition of a logical partitioned platform is depicted in which illustrative embodiments may be implemented. Process 600 is a software process executed within a logical partitioned platform, such as logical partitioned platform 200 of FIG. 2. Process 600 can be executed on an independent operating system image within the partition, such as independent OS images 202, 204, 206, and 208 of FIG. 2.

Process 600 begins by making a call to a partition management firmware for the partition management firmware to transfer a packet to a second partition (step 610). The packet to be sent can be any a formatted block of data carried that is to be transferred between partitions. Partition management firmware can be partition management firmware 210 of FIG. 2. Partition management firmware executes a process, such as process 500 of FIG. 5, concurrently with the execution of process 600 such that processes 500 and 600 are executing in parallel.

When the partition management firmware has finished sending the packet to the partition management firmware, the partition management firmware sets a copy-complete bit. When the copy-complete bit is set, the copy-complete bit indicates that that the packet has been copied into the buffer of the second partition, and that the second partition can further process the packet. When cleared, the copy-complete bit indicates that the buffer does not contain a packet that requires further processing. After the copy-complete bit is set, control of the partition is returned to process 600 from the partition management firmware (step 620), with the process terminating thereafter.

Figure 7:
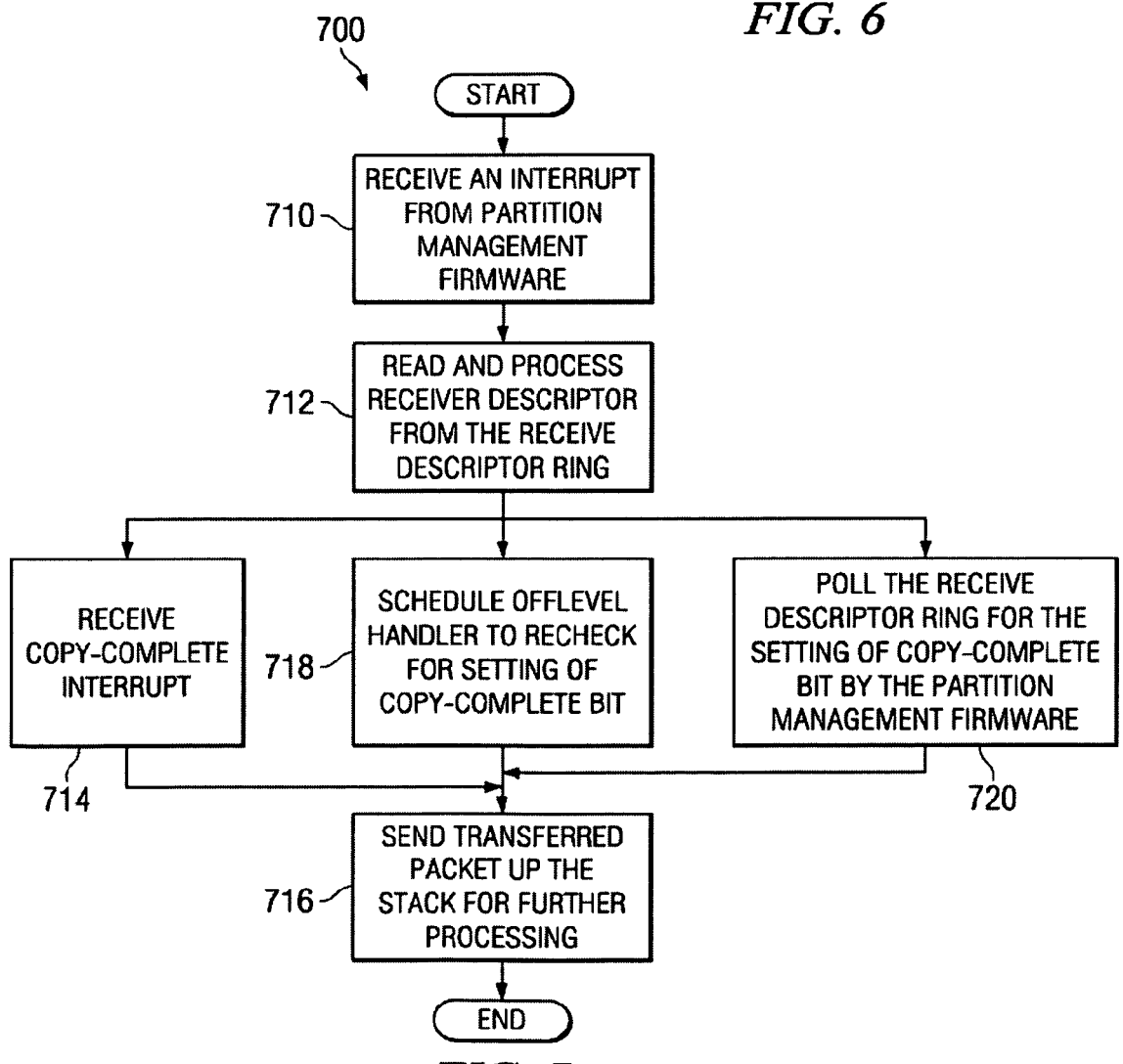
FIG. 7 is a block diagram of parallel data transfer to a second partition of a logical partitioned platform in which illustrative embodiments may be implemented.

Referring now to FIG. 7, a block diagram of parallel data transfer to a second partition of a logical partitioned platform is depicted in which illustrative embodiments may be implemented. Process 700 is executed within a logical partitioned platform, such as logical partitioned platform 200 of FIG. 2. Process 700 can be an independent OS images within the partition, such as independent OS images 202, 204, 206, and 208 of FIG. 2. Process 700 executes concurrently with a partition management firmware executed process, such as process, such as process 500 of FIG. 5, and concurrently with a first partition executed process, such as process 600 of FIG. 6, such that the three processes are executing in parallel.

Process 700 begins by receiving an interrupt from a partition management firmware (step 710), such as partition management firmware 316 of FIG. 3. The interrupt is a synchronous event indicating the need for a change in execution of second partition. The interrupt is a software interrupt that can be implemented as instructions in the instruction set, which cause a context switch to the second partition. The interrupt instructs the process 700 to process a receive descriptor, such as receive descriptor 326.

Responsive to receiving the interrupt, process 700 reads and processes the receive descriptor from the receive descriptor ring (step 712). The receive descriptor was previously written by the partition management firmware into the receive descriptor ring of the second partition. The receive descriptor ring is a list of storage buffer addresses that are in communication with the second partition. The receive descriptor is written into the next free slot within the receive descriptor ring. A bit is associated with the receive descriptor. When the bit is set, the bit indicates that a buffer is associated with the receive descriptor that requires processing. When cleared, the bit indicates that no buffer is associated with the receive descriptor.

Depending on the implementation for notification of the setting of copy-complete bit, process 700 then receives a copy-complete interrupt (step 714). The copy-complete interrupt is a synchronous event indicating the need for a change in execution of second partition. The copy-complete interrupt is a software interrupt that can be implemented as instructions in the instruction set, which cause a context switch to process 700. Responsive to receiving the copy-complete interrupt, process 700 sends the transferred packet up the stack for further processing (step 716), with the process terminating thereafter.

As a further alternative process 700 may schedule an offlevel handler to recheck for the setting of the copy-complete bit (step 718). The offlevel handler interprets and executes commands to transmit and receive data. Responsive to the offlevel handler detecting the setting of the copy-complete bit by the partition management firmware, process 700 sends the transferred packet up the stack for further processing (step 716), with the process terminating thereafter.

Alternatively, process 700 may poll the receive descriptor ring for the setting of the copy-complete bit by the partition management firmware (step 720). Responsive to detecting the setting of the copy-complete bit by the partition management firmware, process 700 sends the transferred packet up the stack for further processing (step 716), with the process terminating thereafter.

Thus, the present embodiments provide A computer implemented method, computer product code, and data processing system for transferring data between virtual partitions. A request is received to transfer a packet from a first partition to a second partition. A free buffer is identified from a buffer pool of the second partition, and a receive descriptor is written. A bit within the receive descriptor is set to identify a buffer present in the receive descriptor ring of second partition. A first interrupt is generated to the second partition. The packet is then copied to the free buffer, and the receive descriptor is updated.

When transferring data between virtual partitions according to the described embodiments, the changing and setting of the bits is all performed in a single call to the partition management firmware. The first partition makes the send call to the partition management firmware. The partition management firmware then writes the receive descriptor and sets a bit to identify a receive descriptor within the receive descriptor ring of second partition. The partition management firmware then notifies the second partition, and performs the copy. The partition management firmware then updates the receive descriptor within the receive descriptor ring of second partition.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for transferring data between virtual partitions, the method comprising:
    receiving a request to transfer a packet from a first partition to a second partition;
    responsive to receiving the request, identifying a free buffer from a buffer pool of the second partition;
    responsive to identifying the free buffer, writing a receive descriptor within a receive descriptor ring of the second partition, wherein the receive descriptor includes a first bit;
    responsive to writing the receive descriptor, setting the first bit to identify the receive descriptor;
    responsive to setting the first bit, generating a first interrupt to the second partition;
    responsive to generating the first interrupt, copying the packet to the free buffer; and
    responsive to copying the packet, updating the receive descriptor.

2. The computer implemented method of claim 1, wherein the receive descriptor further comprises a buffer address for the free buffer within receive descriptor ring.

3. The computer implemented method of claim 2, wherein setting the first bit indicates that the free buffer is held by the receive descriptor ring and is unavailable for other uses.

4. The computer implemented method of claim 1, wherein updating the receive descriptor comprises setting a second bit to indicate that the packet has been copied into the free buffer.

5. The computer implemented method of claim 1 further comprising responsive to updating the receive descriptor, generating a second interrupt to the second partition, wherein the second interrupt causes the second partition to process the packet.

6. The computer implemented method of claim 4 further comprising responsive to updating the receive descriptor, scheduling an offlevel handler to check for the setting of the second bit.

7. The method of claim 1 wherein the first partition and the second partition are logical partitions of a logical partitioned data processing system.

8. The method of claim 1, wherein the method steps are sequentially performed in a partition management firmware, the method being executed concurrently with processing in both the first partition and the second partition.

9. A non-transitory computer readable medium having computer program product for transferring data between virtual partitions encoded thereon, the computer program product comprising:
    computer usable program code for receiving a request to transfer a packet from a first partition to a second partition;
    computer usable program code for, responsive to receiving the request, identifying a free buffer from a buffer pool of the second partition;
    computer usable program code for, responsive to identifying the free buffer, writing a receive descriptor within a receive descriptor ring of the second partition, wherein the receive descriptor includes a first bit;
    computer usable program code for, responsive to writing the receive descriptor, setting the first bit to identify the receive descriptor of the second partition;

computer usable program code for, responsive to setting the first bit, generating a first interrupt to the second partition;

computer usable program code for, responsive to generating the first interrupt, copying the packet to the free buffer; and computer usable program code for, responsive to copying the packet, updating the receive descriptor.

10. The non-transitory computer readable medium of claim 9, wherein the receive descriptor further comprises a buffer address for the free buffer within receive descriptor ring.

11. The non-transitory computer readable medium of claim 10, wherein setting the first bit indicates that the free buffer is held by the receive descriptor ring and is unavailable for other uses.

12. The non-transitory computer readable medium of claim 9, wherein updating the receive descriptor comprises setting a second bit to indicate that the packet has been copied into the free buffer.

13. The non-transitory computer readable medium of claim 9 further comprising computer usable program code for, responsive to updating the receive descriptor, generating a second interrupt to the second partition, wherein the second interrupt causes the second partition to process the packet.

14. The non-transitory computer readable medium of claim 13 further comprising computer usable program code for, responsive to updating the receive descriptor, scheduling an offlevel handler to check for the setting of a second bit.

15. The non-transitory computer readable medium of claim 10 wherein the first partition and the second partition are logical partitions of a logical partitioned data processing system.

16. The non-transitory computer readable medium of claim 10, wherein the computer usable program code is sequentially performed in a partition management firmware, the computer usable program code being executed concurrently with processing in both the first partition and the second partition.

17. A data processing system comprising:
a bus;
a communications unit connected to the bus;
a storage device connected to the bus, wherein the storage device includes computer usable program code; and
a processor unit connected to the bus, wherein the processor unit executes the computer usable program code to receive a request to transfer a packet from a first partition to a second partition, responsive to receiving the request, identify a free buffer from a buffer pool of the second partition, responsive to identifying the free buffer, write a receive descriptor within a receive descriptor ring of the second partition, wherein the receive descriptor includes a first bit, responsive to writing the receive descriptor, set the first bit to identify the receive descriptor of the second partition, generate a first interrupt to the second partition, responsive to generating the first interrupt, copy the packet to the free buffer, and responsive to copying the packet, update the receive descriptor.

18. The data processing system of claim 17, wherein the receive descriptor further comprises a buffer address for the free buffer within receive descriptor ring.

19. The data processing system of claim 18, wherein the computer usable program code to set the first bit indicates that the free buffer is held by the receive descriptor ring and is unavailable for other uses.

20. The data processing system of claim 17, wherein the computer usable program code to update the receive descriptor comprises setting a second bit to indicate that the packet has been copied into the free buffer.

* * * * *